Figure 1:
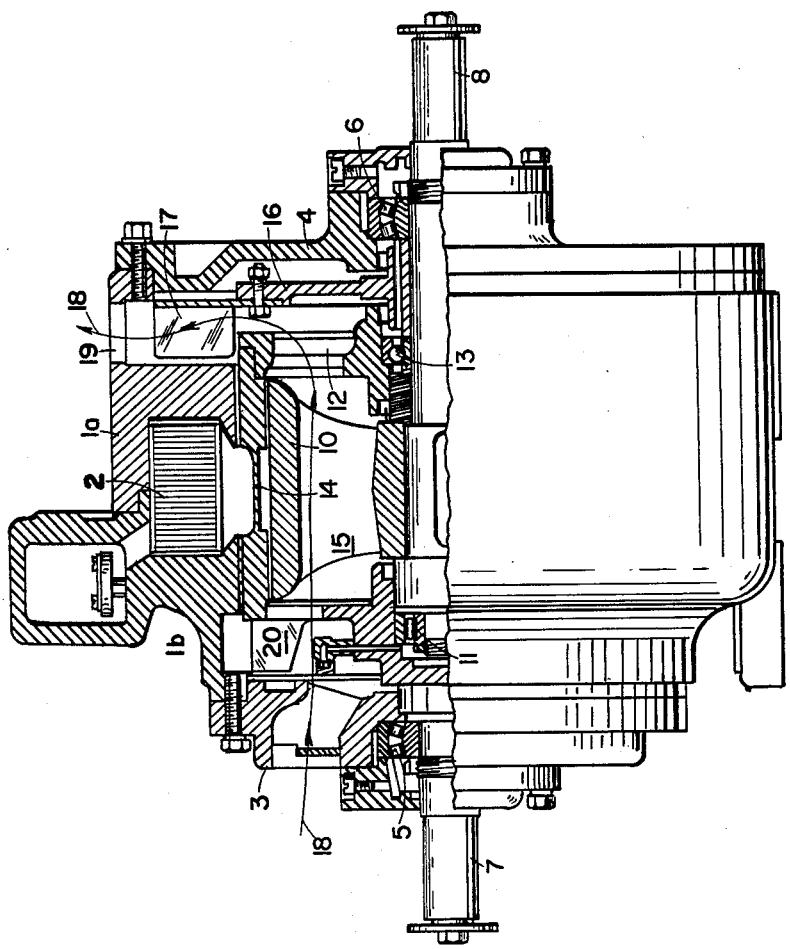

Jan. 29, 1963  E. COHEN ET AL  3,076,109
AIR-COOLED EDDY-CURRENT COUPLING AND BRAKE
Filed Feb. 26, 1959  2 Sheets-Sheet 1

Elie Cohen
Szymon Roth
INVENTORS.

BY  Karl J. Ross
AGENT.

Elie Cohen
Szymon Roth
INVENTORS.

BY Karl F. Ross

AGENT.

United States Patent Office 3,076,109
Patented Jan. 29, 1963

1

3,076,109
AIR-COOLED EDDY-CURRENT COUPLING
AND BRAKE
Elie Cohen and Szymon Roth, Paris, France, assignors to
Leon Naiditch, New York, N.Y.
Filed Feb. 26, 1959, Ser. No. 795,643
Claims priority, application France Jan. 23, 1959
4 Claims. (Cl. 310—105)

This invention relates in general to eddy-current couplings and brakes and has specific reference to an improved apparatus of this general type, which comprises a magnet coil or field winding carried by an external stator surrounding two inner co-axial armatures solid the one with the driving shaft and the other with the driven shaft, each armature being journaled on a pair of ball-bearings with a view to avoiding any outboard bearing mounting likely to cause any contact or magnetic sticking between the component elements involved.

In our U.S. Patent No. 2,847,594 there is described a coupling of this general character, wherein the inner armature is formed with peripheral teeth and slots, the outer armature consisting of a cylindrical member having smooth cylindrical faces in which the torque-transmitting eddy currents are generated. Thus, any heat due to the relative slipping of the parts is developed within this cylindrical armature. Now, when forced-air cooling is resorted to for dissipating this thermal energy difficulties are encountered because of the fact that the area of the hottest surfaces cannot be increased by the provision of cooling fins whilst their temeprature must be kept within reasonable limits to avoid any distortion of the cylindrical armature of overheating.

It is thus the principal object of this invention to avoid this drawback by providing, in an eddy-current coupling and brake machine of this general character, an air cooling arrangement without increasing the over-all dimensions of the machine.

A coupling according to this invention is characterized notably in that it comprises, internally of the stator, an outer armature or rotor formed with teeth and slots, and an inner armature or rotor having a smooth outer peripheral surface, the intermediate portion of said inner armature being hollowed and formed with alternate fins and slots, so that an axial air stream may circulate through these slots and provide an efficient cooling action.

The axial cooling stream of air is generated by a fan mounted angularly on the shaft carrying the inner armature, and the stator as well as the lateral flange or flanges of the coupling are formed with adequate apertures constituting air inlets and outlets.

According to an advantageous embodiment of this invention, the crenellated outer armature is formed with a zone of high reluctance or magnetic resistance which registers with the magnet coil housed in the stator, the purpose of this reluctance zone being to counteract the passage of the magnetic flux through the thickness of this armature in a direction parallel to its axis, so that this flux is compelled to flow radially through the teeth and slots at the lateral ends of said armature.

According to another feature of this invention, one of the lateral flanges of the outer armature is also formed with cooling fins projecting in the path of the air stream circulating in a substantially axial direction through the inner armature.

Finally, according to a modified embodiment, the cooling fins constituting the "spokes" of the inner armature are formed with lateral extensions on either side of its cylindrical peripheral portion, in order to constitute the blades of a centrifugal fan, whereby the air drawn laterally into the coupling is forced radially outwards and vented through peripheral apertures formed in the stator.

Figure 2:
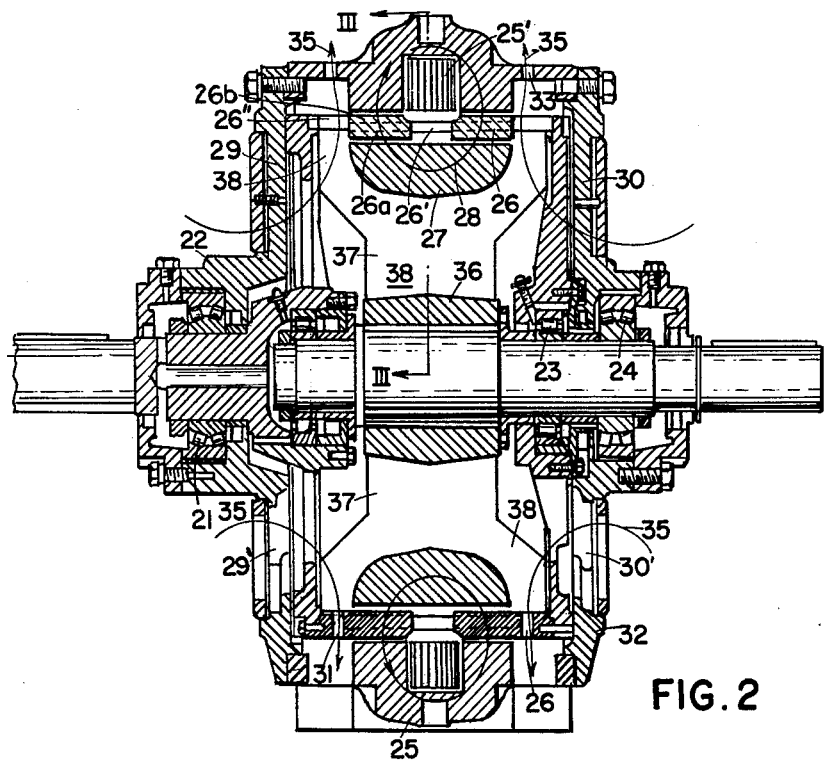

In the attached drawing:
FIGURE 1 is a fragmentary axial section illustrating a first embodiment of this invention;
FIGURE 2 shows in axial section a modified embodiment; and
FIGURE 3 is a half cross-section of the apparatus shown in FIG. 2, taken on the line III—III thereof.

In the coupling illustrated in FIG. 1 of the drawing, the stator is shown as consisting of two juxtaposed portions 1a, 1b forming therebetween a recess adapted to receive the magnet coil or field winding 2. The lateral faces of the stator consist of flanges 3, 4. At least one of these flanges is perforated to permit the ingress of cooling air in the coupling, as will be explained presently. These flanges are also formed with central cavities in which roller or ball bearings 5, 6 are fitted. Mounted in these bearings are shafts 7 and 8, respectively, of which the former is rigid with a first or outer armature 9 and the latter with a second or inner armature 10. The hub of armature 9 is rotatably mounted by means of a ball bearing 11 on the inner end of shaft 8. The flange 12 on the other side of armature 9 is formed with a hub rotatably mounted by means of another ball bearing 13 on the intermediate portion of shaft 8, as shown. The outer armature 9 is therefore properly supported at both ends, contrarily to the conventional overhanging mounting, and its length is immaterial, as the risk of contacting the inner face of the stator is definitely avoided.

Figure 3:
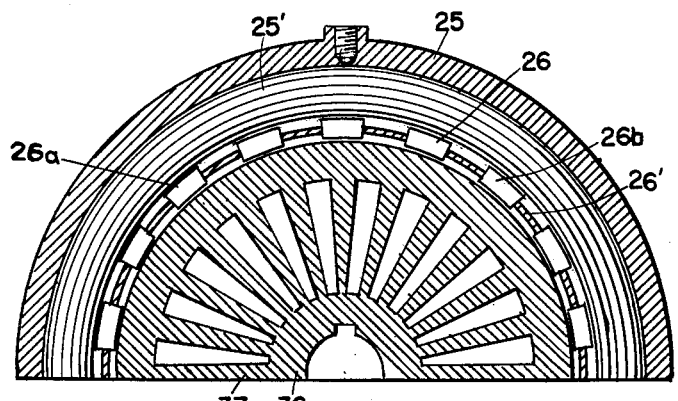

The outer peripheral portion of the outer armature 9 is formed with teeth and slots having the general character of the crenellations 26a shown in FIG. 3; the intermediate portion 14 is reduced to a minimum thickness with a view to preventing leakage or stray flux from flowing therethrough. The lines of force issuing from the pole faces of the stator are thus compelled to flow through the outer extremities of these teeth and slots before entering the magnetic circuit consisting of the thickness of the peripheral portion of the inner armature 10.

The cylindrical surface of armature 10 is smooth. Consequently, the outer armature 9 will constitute the field magnet or inductor of the coupling and the eddy currents are generated in the inner armature 10.

The outer portion of armature 10 is connected to its hub through radial fins 15 representing the plan spokes of a wheel. A sufficient gap is left between adjacent fins to permit the axial flow of cooling air through the armature. Rotatably solid with an intermediate portion of shaft 8 is a fan 16 of which the blades 17 rotate in an annular cavity formed between the stator portion 1a and flange 4. The flange 3, apertured as already explained, together with the end flanges supporting the outer armature 9, provides a passage for the circulation of cooling air along a path shown by the arrows 18 in FIG. 1. The suction necessary for creating this air stream is generated by the rotational movement of blades 17 of fan 16. As it flows through the apparatus, the air dissipates the heat from the fins 15 in which the heat developed by the coupling slip is propagated by thermal conductivity. Then the heated air is forced by the fan through discharge apertures 19 formed in the stator, as shown.

Another air stream builds up across the teeth and slots of the outer armature 9 in order to cool directly the outer smooth surface of armature 10. As may be seen in the left-hand portion of FIG. 1, the left-hand flange of armature 9 is also formed with cooling fins 20 providing an efficient stirring action. The provision of cooling fins 15 increases considerably the area of the metal in contact with the air stream, and consequently the heat-dissipating capacity of this apparatus is considerably higher than in any other couplings proposed up to now.

In the embodiment illustrated in FIGS. 2 and 3 of the drawing, the arrangement is substantially similar to the preceding one shown in FIG. 1, as far as the set of bearings 21, 22, 23, 24 are concerned, thus ensuring a reliable coaxial mounting of the rotating elements; the relative arrangement of a first outer armature 26, provided with crenellations 26a, and of a second inner armature 27 inside a stator 25 with field winding 25' is also of similar character. In this embodiment, the intermediate portion of the operative peripheral portion of armature 26 is perforated, as shown at 26', though it could also be reduced to a minimum thickness, as illustrated for the armature 14 of FIG. 1, in order to prevent leakage or stray flux from flowing in the longitudinal direction of the teeth and slots of said outer armature, so that the magnetic flux is compelled to flow through the thickness of armature 27 along a path illustrated by the line of force 28. In this embodiment, moreover, lateral apertures 29', 30' are formed in the flanges 29 and 30 of the stator supplementing the peripheral apertures 31, 32, 33 and 34, so that the cooling air may circulate in the direction of the arrows 35. In this case, the cooling stream is not completely axial, but comprises a radial end portion. To this end, the inner armature 27 is connected to its hub 36 through radial cooling fins 37. In the vicinity of this hub, the fins have a width substantially equal to the hub width; yet their width increases towards the peripheral portion of the inner armature to provide lateral projections 38 acting like the blades of a centrifugal fan. The air may be discharged radially through further apertures 26" formed in the cylindrical surface of the outer armature 26.

Of course, many modifications and alterations may be made on the embodiments shown and described herein, without departing from the spirit and scope of the invention as set forth in the appended claims.

What we claim is:

1. In an electromagnetic eddy-current coupling, in combination, a first and a second shaft, an inner armature rotatable with said first shaft, a crenellated outer armature rotatable with said second shaft and concentrically surrounding said inner armature, a stator surrounding said armatures and provided with air-circulation apertures, a generator of magnetic flux on said stator, drive means for rotating said inner armature by imparting rotation to said outer armature, said inner armature having an annular peripheral portion permeable to said flux and supporting means for said peripheral portion secured to said first shaft, said supporting means being provided with axially extending air passages, first centrifugal fan means supported by said first shaft within said stator and alongside said peripheral portion for rotation in unison with said inner armature, said fan means upon such rotation creating a stream of cooling air traversing said apertures and said passage and second centrifugal fan means on said second shaft projecting axially beyond said outer armature at a location remote from said first fan means and radially offset from said passages for agitating said stream of cooling air.

2. The combination according to claim 1 wherein said outer armature has a portion opposite said second fan means projecting axially beyond said peripheral portion of said inner armature, said first fan means being mounted on said first shaft for rotation in an orbit surrounding the axially projecting portion of said outer armature.

3. In an electromagnetic eddy-current coupling, in combination, a first and second shaft, an inner armature rotatable with said first shaft and provided with a smooth cylindrical outer periphery, said inner armature having axially extending air passages close to said outer periphery, a stator provided with a smooth cylindrical internal periphery coaxially surrounding said inner armature and forming an annular clearance therebetween, an outer armature rotatable with said second shaft and occupying said clearance in coaxially spaced relationship with said cylindrical peripheries, said outer armature being provided with internal crenellations facing said outer periphery of said inner armature, a generator of magnetic flux on said stator, drive means for rotating one of said armatures, thereby inducing in said inner armature a flow of eddy currents due to the relative slip between said armatures, first centrifugal fan means supported by said first shaft for rotation in unison with said inner armature to create a stream of cooling air through said passages, thereby dissipating the heat generated in said inner armature by said eddy currents, and second centrifugal fan means on said second shaft projecting axially beyond said outer armature at a location remote from said first fan means and radially offset from said passages for agitating said stream of cooling air.

4. In an electromagnetic eddy-current coupling, in combination, a first and a second shaft, an inner armature rotatable with said first shaft, a crenellated outer armature rotatable with said second shaft and concentrically surrounding said inner armature, a stator surrounding said armatures and provided with air-circulation apertures, a generator of magnetic flux on said stator, drive means for rotating said inner armature by imparting rotation to said outer armature, said inner armature having an annular peripheral portion permeable to said flux and a series of radial fins supporting said peripheral portion and secured to said first shaft, said fins forming axially extending air passages, and centrifugal fan means supported by said first shaft within said stator and alongside said peripheral portion as integral extensions of said fins for rotation in unison with said inner armature, said fan means upon such rotation creating a stream of cooling air traversing said apertures and said passages, said outer armature having an apertured annular portion surrounding said extensions.

References Cited in the file of this patent

UNITED STATES PATENTS

| | | |
|---|---|---|
| 2,293,508 | Killam | Aug. 18, 1942 |
| 2,428,104 | Winther | Sept. 30, 1947 |
| 2,648,020 | Jaeschke | Aug. 4, 1953 |
| 2,777,965 | Winther | Jan. 15, 1957 |
| 2,827,580 | Jaeschke | Mar. 18, 1958 |
| 2,847,594 | Cohen | Aug. 12, 1958 |
| 2,870,351 | Orchard | Jan. 20, 1959 |
| 2,871,383 | King | Jan. 27, 1959 |
| 2,939,023 | Fehr | May 31, 1960 |

FOREIGN PATENTS

| | | |
|---|---|---|
| 1,132,712 | France | Nov. 5, 1956 |